US012704442B2

(12) United States Patent
Engel et al.

(10) Patent No.: US 12,704,442 B2
(45) Date of Patent: Aug. 11, 2026

(54) METHOD FOR FIXING A THIN-FILM MATERIAL TO A SLIDE

(71) Applicant: Siemens Healthcare Diagnostics Inc., Tarrytown, NY (US)

(72) Inventors: Thomas Engel, Aalen (DE); Gabriele Hörnig, Fürth (DE); Gaby Marquardt, Hausen (DE); Daniela Seidel, Baiersdorf (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 908 days.

(21) Appl. No.: 17/274,158

(22) PCT Filed: Aug. 26, 2019

(86) PCT No.: PCT/IB2019/057142

§ 371 (c)(1),
(2) Date: Mar. 5, 2021

(87) PCT Pub. No.: WO2020/049400

PCT Pub. Date: Mar. 12, 2020

(65) Prior Publication Data

US 2021/0239580 A1 Aug. 5, 2021

(30) Foreign Application Priority Data

Sep. 6, 2018 (EP) .................................... 18192845

(51) Int. Cl.

| | |
|---|---|
| ***G01N 1/28*** | (2006.01) |
| ***G01N 15/00*** | (2024.01) |
| ***G01N 15/01*** | (2024.01) |
| ***G01N 35/00*** | (2006.01) |
| ***G02B 21/34*** | (2006.01) |

(52) U.S. Cl.

CPC ........... *G01N 1/2813* (2013.01); *G01N 15/00* (2013.01); *G01N 35/00029* (2013.01); *G02B 21/34* (2013.01); *G01N 15/01* (2024.01); *G01N 2035/00138* (2013.01)

(58) Field of Classification Search

CPC ................. G01N 1/2813; G01N 15/00; G01N 35/00029; G01N 2015/0065; G01N 2035/00138; G02B 21/34

See application file for complete search history.

(56) References Cited

U.S. PATENT DOCUMENTS

| | | | | |
|---|---|---|---|---|
| 3,551,023 A * | 12/1970 | Brackett | .............. | G06K 19/022 359/398 |
| 4,597,982 A * | 7/1986 | Delameter | ............ | G01N 1/312 435/40.51 |
| 5,021,294 A * | 6/1991 | Karasawa | ............. | G02B 21/34 428/419 |
| 2012/0115179 A1 | 5/2012 | Hauden et al. | | |
| 2015/0253224 A1 | 9/2015 | Liffmann et al. | | |

FOREIGN PATENT DOCUMENTS

| | | | | |
|---|---|---|---|---|
| CN | 201444213 U | 4/2010 | | |
| DE | 102009032428 B4 | 2/2015 | | |
| EP | 3171178 A1 | 5/2017 | | |
| JP | 2002022626 A * | 1/2002 | | |
| WO | WO-2017070500 A1 * | 4/2017 | ............ | C03C 3/087 |

OTHER PUBLICATIONS

Merritts D, et al "Adhesion, Cohesion, and Surface Tension Demonstration"; Initial publication date: Oct. 3, 2005; https://serc.carleton.edu/sp/library/demonstrations/examples/ surfacetension.html; accessed on Jul. 3, 2024 (2 total pages) (Year: 2005).*

"Physical Properties of Solvents" ; from Lab Basics, p. 144, by Sigma-Aldrich; first available online: Jul. 27, 2021; https://www.sigmaaldrich.com/deepweb/assets/sigmaaldrich/marketing/global/documents/614/456/labbasics_pg144.pdf; accessed on Jul. 5, 2024 (1 page). (Year: 2021).*

Machine-Generated Translation of JP-2002022626-A (Year: 2002).*

Merritts D, et al "Adhesion, Cohesion, and Surface Tension Demonstration"; Initial publication date: Oct. 3, 2005; https://serc.carleton.edu/sp/library/demonstrations/examples/ surfacetension.html; accessed on Jul. 3, 2024 (2 total pages, provided in Office Action mailed Jul. 11, 2024) (Year: 2005).*

Cromey,D., "The importance of #1.5 thickness coverslips for Microscopy". Technical Report, the UA Microscopy Alliance, The University of Arizona; https://web.archive.org/web/20180202082939/http://microscopy.arizona.edu/learn/printable-materials, (first available Sep. 2015; updated Oct. 2017) (Year: 2015).*

"Microscopy Basics: Numerical Aperture", NIKON's MicroscopyU, Contributing Author: Michael W. Davidson, National High Magnetic Field Laboratory, accessed from https://www.microscopyu.com/microscopy-basics/numerical-aperture. 4 pages total. Accessed on Apr. 2, 2026. (Year: 2026).*

"Numerical Aperture and Resolution", EVIDENT Scientific (formerly OLYMPUS), by Abramowitz M., and Davidson, M.W., accessed at https://evidentscientific.com/en/microscope-resource/knowledge-hub/anatomy/numaperture. 13 pages total. Accessed on Apr. 2, 2026. (Year: 2026).*

International Search Report and Written Opinion of related International Application No. PCTIB2019057142 mailed Dec. 6, 2019.

Extended European Search Report of related Application No. EP18192845.8 mailed Mar. 14, 2019.

* cited by examiner

*Primary Examiner* — Aaron J Kosar
*Assistant Examiner* — Andrew T Moehlman
(74) *Attorney, Agent, or Firm* — Dugan & Dugan, PC

(57) ABSTRACT

The invention relates to a method for fixing a thin-film material to a flat surface of a slide for a microscopy apparatus, by means of a liquid. The method comprises: applying a quantity of liquid to the flat surface of the slide; applying the thin-film material to the surface of the slide, which is wetted at least in part, preferably completely with liquid; applying a sample to be microscopically examined to the surface of the thin-film material which faces away from the surface of the slide wetted with liquid; wherein the surface of the thin-film material facing away from the surface of the slide wetted with liquid is hydrophilic.

17 Claims, 2 Drawing Sheets

Applying An Amount Of Liquid
1
Applying Thin-Film Material
2
Applying A Specimen
3
Examining The Specimen By Microscopy
4
Removing Thin-Film Material
5
Cleaning And Drying
6
Reusing The Slide
7

METHOD FOR FIXING A THIN-FILM MATERIAL TO A SLIDE

CROSS REFERENCE TO RELATED APPLICATIONS

This is a 371 of PCT/IB2019/057142, filed Aug. 26, 2019, which claims priority to European Patent Application No. EP 18192845.8, filed Sep. 6, 2018, both of which are hereby incorporated by reference herein in their entireties for all purposes.

FIELD

The invention lies in the field of automated analyzers and relates to a method for a hematology analyzer for analyzing cells in a specimen using a microscopy apparatus.

BACKGROUND

So-called "automated cell counters" are used with increasing success for the automated analysis of cells. Examples thereof include the Advia® 2120, Sysmex® XE-2100™, and Cobas® m 511 hematology systems. In addition to the high throughput, these automated appliances provide a number of advantages such as, for example, a high objectivity (no observer-dependent variability), an elimination of statistical variations which are usually linked to a manual count (counting large numbers of cells), and the determination of numerous parameters that would not be available within a manual count, and also, as mentioned, more efficient and more cost-effective handling. Some of these appliances can process 120 to 150 patient specimens per hour.

The technical principles of the automated individual cell counters like in the Advia® 2120 and Sysmex® XE-2100™ hematology appliances, for example, are usually based either on an impedance (resistance) measurement or on an optical system (scattered light or absorption) measurement. Further, imaging systems which automatically image and assess, e.g., cells of a blood smear, like in the Cobas® m 511, CellaVision® DM96, and CellaVision® 1200 hematology appliances, for example, have become commonplace.

In the case of impedance methods, the cell count and the determination of the magnitude thereof are implemented on the basis of the detection and measurement of changes in the electrical conductivity (resistance) caused by a particle moving through a small opening. Particles such as, e.g., blood cells are not conductive themselves but are suspended in an electrically conductive diluent. If such a suspension of cells is guided through an opening, the impedance (resistance) of the electrical path between the two electrodes located on each side of the opening temporarily reduces during the passage of a single individual cell.

In contrast to the impedance method, the optical method comprises guiding a laser light beam or an LED light beam through a thinned blood specimen, which is captured in a continuous flow by the laser beam or the LED light beam. In the process, the corresponding light beam can be guided to the flow cell by means of an optical waveguide, for example. Every cell passing through the detection zone of the flow cell scatters the focused light. The scattered light is then detected by a photodetector and converted into an electrical pulse. The number of pulses generated here is directly proportional to the number of cells which pass through the detection zone during a specific time interval.

In the optical methods, the light scattered by the individual cell passing through the detection zone is measured at various angles. As a result, the scattering behavior of the respective cell for the optical radiation is captured, allowing conclusions to be drawn about, for example, the cell structure, shape, and reflectivity. This scattering behavior can be used to differentiate between different types of blood cells and can be used to employ the derived parameters for diagnosing deviations of the blood cells of this specimen from a standard which, for example, was obtained from a multiplicity of reference specimens that were classified as normal.

To produce blood smears for differential diagnostics, hitherto a blood specimen has usually been smeared on a glass specimen slide and evaluated in manual or automated fashion by microscopy. Glass specimen slides cause high costs in production. Further, glass breaks very easily and sharp edges can arise in the case of a break, leading to an increased risk of injury to the laboratory staff. In laboratories, in particular, incised wounds are particularly dangerous since this damages the natural barrier layer of the skin and enables an ingress of pathogens. As a result, there is a significant increase in the risk of an infection with pathogenic agents.

For the application of blood and the examination of the latter by microscopy, glass specimen slides can be replaced by thin-film materials, such as sheets, as carrier materials. However, the use of a thin-film material such as a sheet, for example, as a carrier material for the application of blood and the examination of the latter by microscopy is accompanied by the problem of the sheet being very flexible and pliable in comparison with glass and, as a result thereof, not having great planarity. However, great planarity is required in microscopy in order to facilitate good recordings of the cells. In automated microscopy in particular, great planarity is also important for an exact alignment of the specimen in order to obtain high-quality images.

SUMMARY OF THE INVENTION

The object on which the invention is based is therefore that of providing an apparatus and a method by means of which a planarization of the thin-film material can be achieved. Since current high-resolution microscopes for the automated assessment of cells in blood smears operate with a high numerical aperture, and hence with immersion between specimen slide and objectives and possibly also between specimen slide and condenser, the insertion thickness of a sheet specimen slide including an apparatus for planarization is restricted to a thickness of approximately 1.4 mm. Consequently, there is only very limited space available in respect of this insertion thickness for an apparatus and a method used to implement a planarization of the thin-film material.

The object is achieved by a method according to the invention, the corresponding use of a method and an analyzer as claimed in the independent patent claims. Advantageous developments of the invention are also given by the dependent claims, in particular.

The invention proceeds from the concept of temporarily fixing thin-film material on a transparent carrier with good optical properties and great planarity with the aid of a small quantity of water. For applying blood to the thin-film material, it is moreover important for the corresponding surface on which the blood is to be applied to be a hydrophilic surface.

The subject matter of the invention comprises, in particular, a method for fixing a thin-film material on a planar surface of a slide for a microscopy apparatus by means of a liquid, the method comprising the following steps: applying a quantity of liquid to the planar surface of the slide, applying the thin-film material to the surface of the slide which has been wetted at least in part, preferably in full, with liquid, applying a specimen to be examined by microscopy to the surface of the thin-film material facing away from the surface of the slide wetted with liquid, wherein the surface of the thin-film material facing away from the surface of the slide wetted with liquid is hydrophilic.

In this case, the liquid drop spreads as a result of capillary forces only in conjunction with the film, particularly in the case of small geometries and, in particular, depending on the surface tension.

In a preferred embodiment, the surface of the thin-film material facing away from the surface of the slide wetted with liquid is not hydrophilic and/or hydrophobic. By way of example, this is advantageous when observing blood fats and/or other apolar and/or lipophilic substances in the specimen. Advantageously, lipophilic and/or lipophobic properties, for example, can also be modified accordingly, for example, by means of one or more markers and/or reagents.

The method according to the invention is advantageous in that a planarization of the thin-film material can be reliably achieved with particularly simple means. The costs associated with producing a blood smear can be significantly reduced by using a thin-film material such as a sheet, for example, which is rendered possible thereby. The production of a sheet specimen slide is substantially cheaper than that of a glass specimen slide. Further, a sheet specimen slide is up to 10-times thinner than glass. This renders it possible to produce a cartridge with specimen slides which, while having the same dimensions, contains up to 10-times more specimen slides, as a result of which more specimen slides can be simultaneously loaded in a corresponding appliance. Further, less waste is produced when sheet specimen slides are used instead of glass specimen slides. Moreover, a thin-film material such as a sheet, for example, is not breakable in comparison with glass, as a result of which the risk of injury due to sharp edges is significantly reduced.

The slide preferably is a specimen slide which, in contrast to conventional specimen slides, consists of shatterproof glass. Preferably, the slide has a high edge quality and/or great stability. A high edge quality can increase the stability of the glass. Great stability of the slide is particularly advantageous for multiple use, or for repeated use in an automated analyzer.

Particularly preferably, the slide consists of a Corning Gorilla™ glass from Corning Incorporated and/or a chemically reinforced aluminosilicate glass such as, e.g., Xensation™ Cover from SCHOTT Technical Glass Solutions GmbH.

In an advantageous configuration of the method according to the invention, the method further includes the following step: using microscopy to examine the specimen applied to the surface of the thin-film material. This is advantageous in that a corresponding image of the microscopic structure of the specimen is obtained.

In an advantageous configuration of the method according to the invention, the method further includes the following steps: removing the thin-film material with the applied specimen from the slide, cleaning and drying the surface of the slide that was wetted with liquid, and reusing the slide. Cleaning is preferably implemented with air. This is advantageous in that the slide can be reused. This may lead to significant cost advantages and moreover avoids unnecessary pollution and reduces the overall power needs.

Preferably, the thin-film material with the applied specimen is removed from the slide by means of a blade and/or by being blown off by a gas, preferably air.

In a further advantageous configuration of the method according to the invention, the overall thickness of the slide with applied liquid, thin-film material, and specimen is less than 1.4 mm, wherein the overall thickness of the slide with applied liquid and thin-film material but without specimen is particularly preferably 1 mm. This is advantageous in that the method is also suitable for use in a high-resolution microscope for the automated assessment of cells in blood smears, having a high numerical aperture and immersion between specimen slide and objectives and optionally also between specimen slide and condenser, since the overall thickness is less than or equal to the maximum possible insertion thickness of 1.4 mm.

In a further advantageous configuration of the method according to the invention, the thin-film material is a pliable sheet. In this case, the thin-film material is preferably a plastic sheet, particularly preferably a glass sheet, which preferably has an ultrathin configuration. This is advantageous in that a glass sheet generally has substantially better optical properties than plastic sheets, for example.

In a further advantageous configuration of the method according to the invention, the liquid is largely transparent or see-through, particularly preferably transparent or see-through, in the spectral range used by the microscopy apparatus. Largely transparent or see-through means that what is behind can be identified relatively clearly, i.e., the material is largely transmissive to radiation of the respective spectral range, preferably, e.g., the visible spectrum.

In a further advantageous configuration of the method according to the invention, the liquid has a viscosity that is less than or equal to the viscosity of water. This is advantageous in that there is a uniform distribution of the water between the thin-film material, such as, e.g., the sheet, and the carrier on account of the low viscosity of the liquid. As a result, a similarly great planarity is generated in the sheet as in the carrier.

In a further advantageous configuration of the method according to the invention, the liquid has high wettability and/or a low tendency to evaporate. By way of example, this is advantageous on account of the durability the specimen.

In a further advantageous configuration of the method according to the invention, the liquid contains water.

In a further advantageous configuration of the method according to the invention, the liquid consists of water. This is advantageous in that fixation with water allows a thin-film material, such as, e.g., a sheet, to be used for high-throughput microscopy in a simple and cost-effective manner. Fixing the sheet with water is accompanied further by the advantage that the sheet can be detached from the carrier again following the examination by microscopy. The composition of water facilitates a remnant-free detachment of the sheet from the carrier and hence facilitates particularly simple reuse of the carrier. The sheet which was examined by microscopy and detached from the carrier again is subsequently disposed of. The carrier is cleaned, for example using air in the system, and can subsequently be reused. Here, the low viscosity of water facilitates a uniform distribution of the water between the thin-film material and the carrier. On account of its low viscosity, water forms a very uniform thin film between the carrier and the thin-film material and thus temporarily binds the thin-film material to the carrier. Hence, similarly great planarity is generated in the sheet as in the carrier. Moreover, as a result of the use of water, the influence of the fixation on the optical properties is kept very low or, advantageously, there are no changes in the optical properties as a result of the fixation. After the examination-by-microscopy procedure has been completed, the thin-film material can be detached from the carrier again. To reuse the carrier, the latter then preferably only still needs to be dried and can subsequently be reused. Here, the composition of the water facilitates a remnant-free detachment of the thin-film material from the carrier.

In a further advantageous configuration of the method according to the invention, the amount of liquid applied to the planar surface of the slide is 3.7 to 11 nanoliters per $mm^2$, preferably 4.8 to 9.6 nanoliters per $mm^2$, particularly preferably 5.3 nanoliters per $mm^2$.

In a further advantageous configuration of the method according to the invention, the slide is transparent in the visible spectral range.

In a further advantageous configuration of the method according to the invention, the thin-film material is covered by a second thin-film material, e.g., a second sheet, with the thickness of the second thin-film material or the second sheet preferably being 0.1 to 0.17 mm. Preferably, the thin-film material is covered by the second thin-film material after the specimen has been applied. This is advantageous in that the second sheet serves as a coverslip. As a rule, no coverslips are used in hematology; however, there are other applications in which the use of covered specimens is advantageous. Additionally, an uncovered specimen often cannot be examined by microscopy on account of the technical reality of the microscope used.

Preferably, the thin-film material and/or the second thin-film material and/or the slide have/has one or more markings comprising, e.g., an identification number and/or a reference mask and/or a barcode and/or a serial number and/or a serial label.

Preferably, the slide has a form in which the edges have a rounded-off shape. This is advantageous in that there can be a more reliable avoidance of glass breaking.

In a further advantageous configuration of the method according to the invention, the specimen comprises a human and/or animal bodily fluid, preferably blood. The specimen preferably contains blood cells.

Further subject matter of the invention relates to the use of a method according to the invention in an automated analyzer, wherein the analyzer preferably comprises an apparatus for lifting the thin-film material, e.g., the sheet, from the slide.

Further subject matter of the invention relates to the use of a method according to the invention in an automated analyzer, wherein the analyzer preferably comprises an apparatus for cleaning and drying the slides.

Further subject matter of the invention relates to the use of a method according to the invention in an automated analyzer, wherein the analyzer preferably comprises a cartridge for storing the slides and/or the thin-film material.

Further subject matter of the invention relates to the use of a method according to the invention in an automated analyzer, wherein the analyzer preferably comprises an apparatus for marking and/or labeling the slides.

Further subject matter of the invention relates to the use of a method according to the invention in an automated analyzer, wherein the analyzer preferably comprises an apparatus for identifying and/or recognizing defective slides.

Further subject matter of the invention relates to an automated analyzer comprising means for automatically carrying out a method according to the invention, wherein the means preferably comprise a control device which is configured such that it can control an automated implementation of a method according to the invention.

Preferably, the analyzer according to the invention is an automated analyzer, particularly preferably a partly automated or fully automated hematology analyzer. Preferably, the microscope comprises one or more cameras. Preferably, the camera comprises a digital recording appliance embodied to record the light field imaged in the microscope. Preferably, the digital recording appliance comprises one charge-coupled device (CCD) chip or a plurality of CCD chips. Particularly preferably, the digital recording appliance is based on complementary metal oxide semiconductor (CMOS) technology and/or comprises a CMOS chip.

The invention is based on an optical microscope which is equipped with apparatuses for differential interference contrast, for example. In terms of splitting, such microscopes can be adapted, in this case, to the requirements of hematology. This adaptation is substantially implemented by a targeted choice of the beam offset on the beam path through the measurement object. By way of example, the measurement object is a spread blood specimen.

BRIEF DESCRIPTION OF THE DRAWINGS

The invention will be explained once again in more detail as a specific exemplary embodiment on the basis of the attached drawings. The shown example represents a preferred embodiment of the invention. In detail.

DETAILED DESCRIPTION OF THE INVENTION

Figure 1:
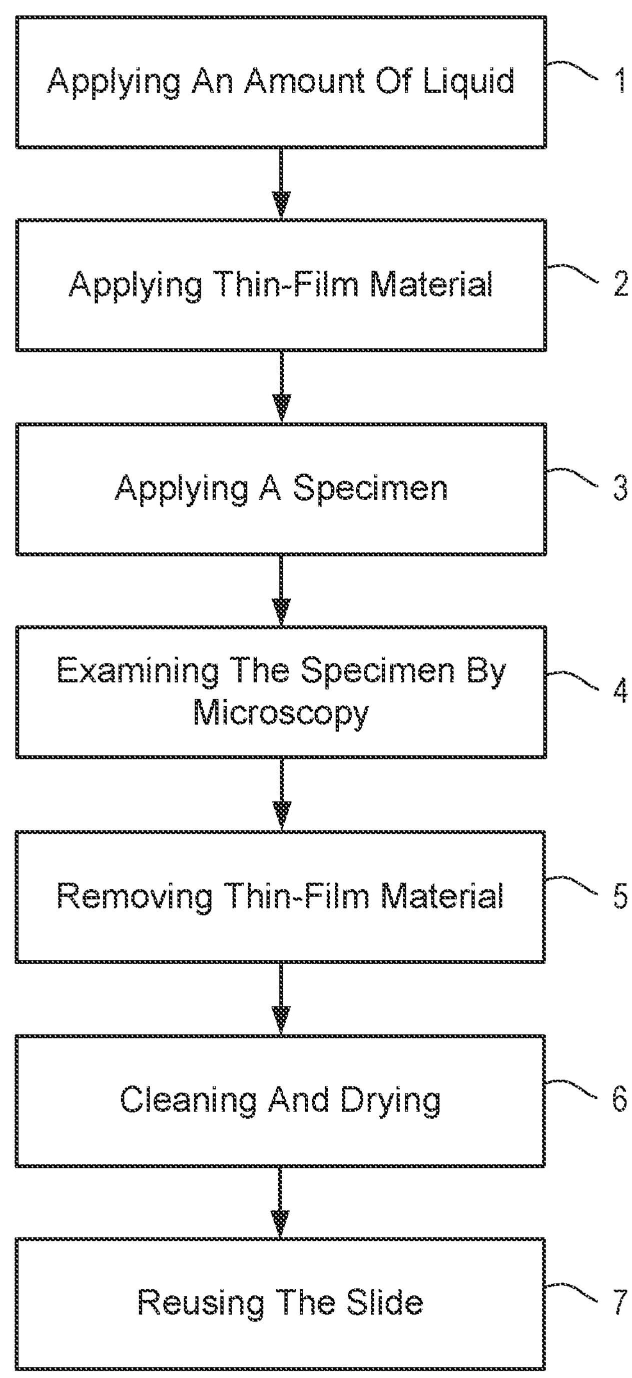
FIG. 1 shows a schematic illustration of the order of events of a method for fixing a thin-film material on a planar surface of a slide.

The method illustrated schematically in FIG. 1 serves to fix a thin-film material on a planar surface of a slide for a microscopy apparatus by means of a liquid. The method comprises the steps set forth below. Initially, a quantity of liquid is applied to the planar surface of the slide (1). Further, the thin-film material is applied to the surface of the slide which has been wetted in part or in full with liquid (2). Further, a specimen to be examined by microscopy is applied to the surface of the thin-film material facing away from the surface of the slide (16) wetted with liquid. Here, the surface of the thin-film material (18) facing away from the surface of the slide (16) wetted with liquid is hydrophilic. Further, the specimen applied to the surface of the thin-film material (18) is examined by microscopy by way of at least one microscopic image of the specimen being recorded. Subsequently, the thin-film material (18) with the applied specimen is removed from the slide (16) and the surface of the slide (16) which has been wetted with liquid is cleaned and dried, with drying preferably being implemented with air. Subsequently, the slide (16) is reused in a further run of the method.

Figure 2:
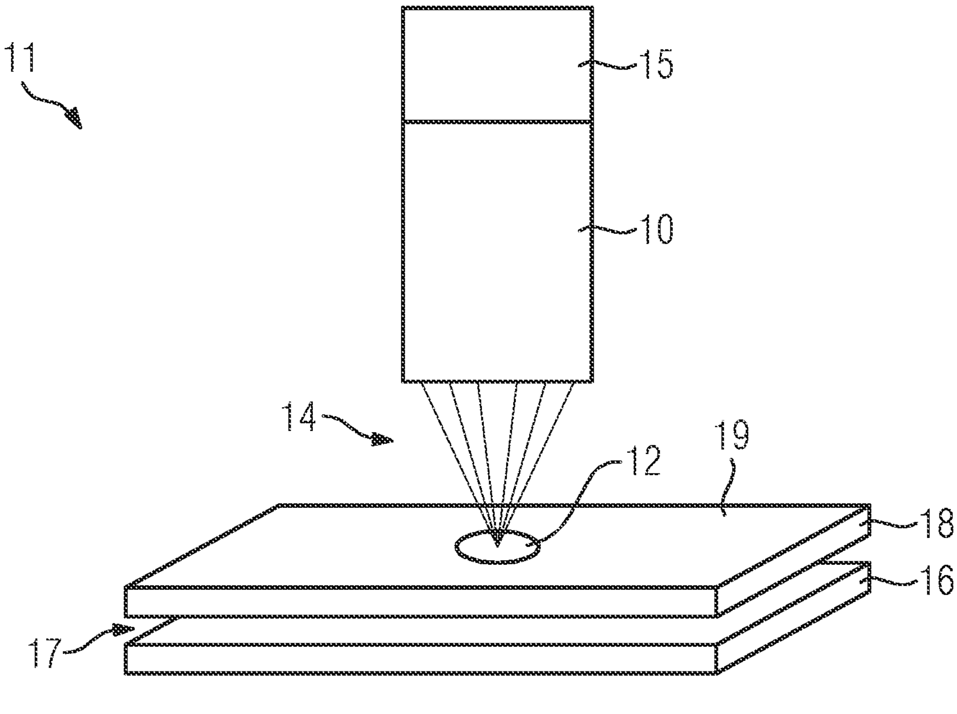
FIG. 2 shows an automated analyzer comprising means for automatically carrying out a method for fixing a thin-film material on a planar surface of a slide.
Figure 2:

The automated analyzer (11) shown in FIG. 2 comprises means for automatically carrying out the method explained in FIG. 1. The means for automatically carrying out the method comprise a control device which is configured such that it can control an automated implementation of the method.

The analyzer (11) is configured to analyze blood cells (12) in a specimen and comprises an optical microscope (10) comprising a light source (13) for illuminating a specimen and a converging lens for collecting and focusing light rays (14) emanating from the illuminated specimen, a camera (15) connected to the microscope (10), an automated pipettor for pipetting liquids, and an automated transfer arm for transporting the thin-film material. The specimen is a blood specimen containing blood cells (12).

Initially, water is pipetted onto the slide (16) by means of the pipettor such that a liquid film (17) forms on the slide (16). Then, a thin-film material (18) in the form of a flexible sheet is applied to the liquid film (17) by means of the transfer arm. Further, the specimen with blood cells (12) is applied to the hydrophilic surface (19) of the thin-film material (18) by means of the pipettor or any other suitable automated apparatus. Here, the hydrophilic surface (19) of the thin-film material (18) is situated on the side of the thin-film material (18) facing away from the liquid film (17).

Consequently, after the method has been carried out, the specimen is located on the hydrophobic surface (19) of the thin-film material (18) for the purposes of microscopic imaging of the specimen. The thin-film material (18) is fixed on the slide (16) by means of the liquid film (17) made of water. As a result, the thin-film material is aligned parallel to the planar surface of the slide (16).

After the specimen has been examined by microscopy (4), the thin-film material (18) is lifted from the slide (16) by means of an automated apparatus for lifting the thin-film material (18) and the thin-film material (18) is removed (5).

Further, the slide (16) is cleaned and dried (6) by means of an automated apparatus for cleaning and drying the slide (16).

Optionally, the thin-film material (18) and/or the slide (16) are/is each transported automatically to a cartridge for storing thin-film materials (18) or slides (16).

Optionally, the slides (16) are marked and/or labeled by means of an automated apparatus for marking and/or labeling the slides (16). Preferably, the marking or label is a respective bijective label or marking.

Optionally, defective slides (16) are identified or recognized by means of an automated apparatus for identifying and/or recognizing defective slides (16), the defective slides then being automatically sorted out and/or brought to a waste container, for example.

LIST OF REFERENCE SIGNS

1 Applying an amount of liquid
2 Applying thin-film material
3 Applying a specimen
4 Examining the specimen by microscopy
5 Removing thin-film material
6 Cleaning and drying
7 Reusing the slide
10 Microscope
11 Analyzer
12 Blood cell
13 Light source
14 Light rays
15 Camera
16 Slide
17 Liquid film
18 Thin-film material
19 Hydrophilic surface

The invention claimed is:

1. A method for fixing a thin-film material on a planar surface of a slide for a high-numerical-aperture microscopy apparatus in an automated analyzer by means of a liquid, the method comprising the following steps:

applying a quantity of liquid to the planar surface of the slide, applying the thin-film material to the planar surface of the slide which has been wetted at least in part with the liquid to provide temporary fixation of the thin-film material to the planar surface to enable subsequent removal of the thin-film material from the planar surface, and applying a specimen to be examined by the high-numerical-aperture microscopy apparatus to a surface of the thin-film material facing away from the planar surface of the slide wetted with the liquid, wherein the surface of the thin-film material facing away from the planar surface of the slide wetted with the liquid is hydrophilic;

wherein the thin-film material comprises a pliable glass sheet having an ultrathin configuration having a thickness of 0.1 mm to 0.17 mm.

2. The method as claimed in claim 1, further including the following step:

using the high-numerical-aperture microscopy apparatus to examine the specimen applied to the surface of the thin-film material.

3. The method as claimed in claim 1, further including the following steps:

removing the thin-film material with the applied specimen from the slide, cleaning and drying the planar surface of the slide that was wetted with the liquid, and reusing the slide.

4. The method as claimed in claim 1, wherein an overall thickness of the slide with applied liquid, the thin-film material, and the specimen is less than 1.4 mm, or wherein an overall thickness of the slide with applied liquid and the thin-film material but without the specimen is 1 mm.

5. The method as claimed in claim 1, wherein the slide consists of shatterproof glass.

6. The method as claimed in claim 1, wherein the liquid is largely transparent in the spectral range used by the high-numerical-aperture microscopy apparatus.

7. The method as claimed in claim 1, wherein the liquid contains water.

8. The method as claimed in claim 1, wherein the amount of liquid applied to the planar surface of the slide is 3.7 to 11 nanoliters per $mm^2$.

9. The method as claimed in claim 1, wherein the slide is transparent in the visible spectral range.

10. The method as claimed in claim 1, wherein the slide consists of glass or plastics.

11. The method as claimed in claim 1, wherein the thin-film material is covered by a second thin-film material having a thickness of 0.1 to 0.17 mm.

12. The method as claimed in claim 1, wherein the specimen comprises a human or animal bodily fluid or blood.

13. The method as claimed in claim 1 wherein the planar surface of the slide has been wetted in full with the liquid.

14. The method as claimed in claim 1 wherein the amount of liquid applied to the planar surface of the slide is 4.8 to 9.6 nanoliters per $mm^2$.

15. The method as claimed in claim 1 wherein the amount of liquid applied to the planar surface of the slide is 5.3 nanoliters per $mm^2$.

16. The method as claimed in claim 1 wherein the liquid has a viscosity that is less than or equal to the viscosity of water.

17. A method for fixing a thin-film material on a planar surface of a slide for a high-numerical-aperture microscopy apparatus in an automated analyzer by means of a liquid, the method comprising:

applying a quantity of liquid to the planar surface of the slide, applying the thin-film material to the planar surface of the slide which has been wetted at least in part with the liquid, and applying a specimen to be examined by the high-numerical-aperture microscopy apparatus to a surface of the thin-film material facing away from the planar surface of the slide wetted with the liquid, wherein the surface of the thin-film material facing away from the planar surface of the slide wetted with the liquid is hydrophilic;

wherein the liquid forms a liquid film layer between the thin-film material and the planar surface of the slide that temporarily fixes the thin-film material to the planar surface of the slide such that the thin film material is removable from the slide after microscopy, and after removing the thin film material, the slide is remnant-free and reusable;

wherein the liquid consists of water; and wherein the slide consists of a chemically reinforced aluminosilicate glass.

* * * * *